United States Patent
Li et al.

(10) Patent No.: US 10,790,871 B1
(45) Date of Patent: Sep. 29, 2020

(54) COLLISION AWARE RADIO RESOURCE ALLOCATION

(71) Applicant: Kabushiki Kaisha Toshiba, Minato-ku (JP)

(72) Inventors: Shengyang Li, Bristol (GB); Usman Raza, Bristol (GB); Aftab Khan, Bristol (GB)

(73) Assignee: Kabushiki Kaisha Toshiba, Minato-ku (JP)

(*) Notice: Subject to any disclaimer, the term of this patent is extended or adjusted under 35 U.S.C. 154(b) by 0 days.

(21) Appl. No.: 16/575,043

(22) Filed: Sep. 18, 2019

(51) Int. Cl.
*H04B 1/7103* (2011.01)
*H04W 28/04* (2009.01)
*H04W 16/10* (2009.01)
*H04W 16/14* (2009.01)

(52) U.S. Cl.
CPC .......... *H04B 1/7103* (2013.01); *H04W 16/10* (2013.01); *H04W 16/14* (2013.01); *H04W 28/04* (2013.01)

(58) Field of Classification Search
CPC .................................................. H04B 1/7103
USPC ......................................................... 375/148
See application file for complete search history.

(56) References Cited

U.S. PATENT DOCUMENTS

2018/0007691 A1* 1/2018 Hall .................. H04L 67/42
2018/0167937 A1* 6/2018 Savelli .................. H04L 1/203

OTHER PUBLICATIONS

Orestis Georgiou, et al., "Low Power Wide Area Network Analysis: Can LoRa Scale?", IEEE Wireless Communications Letters, vol. 6, No. 2, Apr. 2017, pp. 162-165.
Shengyang Li, et al., "How Agile is the Adaptive Data Rate Mechanism of LoRaWAN?", IEEE GLOBECOM, 2018, 6 pages.
LoRaWAN Specification 1.1, 1, p. 1.
Alexandru-loan Pop, et al., "Does Bidirectional Traffic Do More Harm Than Good in LoRaWAN Based LPWA Networks?", IEEE, Dec. 2017, 6 pages.
Usman Raza, et al., "Low Power Wide Area Networks: An Overview", IEEE, 2017, 19 pages.

* cited by examiner

*Primary Examiner* — Lihong Yu
(74) *Attorney, Agent, or Firm* — Oblon, McClelland, Maier & Neustadt, L.L.P.

(57) ABSTRACT

According to an embodiment there is provided a method of radio resource allocation performed in a gateway or network server communicatively connected to a plurality of wireless nodes. The method comprises computing, for each spreading factor out of a number of spreading factors, a probability of successful receipt of an uplink communication from a wireless node from the plurality of wireless nodes based on spreading factor settings of the plurality of wireless nodes, determining, for a given link level budget, a spreading factor that provides a maximum likelihood of successfully completing uplink communications and determining, for the determined spreading factor, a transmission power that provides the given link level budget.

13 Claims, 4 Drawing Sheets

Compute the probabilities $P_{sf}$ that the gateway successfully receives uplink packages using each SF value (P7, P8, P9, P10, P11, P12) based on the gateway utilisation data On the premise of maintaining a link budget level, find the permitted SF value with the maximum probability of success ($P_{sf}$).

Adjust the corresponding TP value so that new setting SF' and TP' still result in the same link budget level.

Compute the probabilities $P_{sf}$ that the gateway successfully receives uplink packages using each SF value (P7, P8, P9, P10, P11, P12) based on the gateway utilisation data On the premise of maintaining a link budget level, find the permitted SF value with the maximum probability of success ($P_{sf}$).

Adjust the corresponding TP value so that new setting SF' and TP' still result in the same link budget level.

FIG. 4

Algorithm 2 Collision aware radio resource optimisation

1: $T_i \leftarrow$ *average packet interval time per node*
2: for $sf := 7$ to $12$ do
3:     $N_{sf} \leftarrow$ *number of nodes using spreading factor* $sf$
4:     $T_{sf} \leftarrow$ *average Time − on − air of a packet using spreading factor* $sf$
5:     $G_{sf} \leftarrow \frac{N_{sf} * T_{sf}}{T_i}$
6:     $P_{sf} \leftarrow e^{-2 * G_{sf}}$
7: $Index \leftarrow$ *link budget level of input SF and TP setting*
8: $maxP \leftarrow -1$
9: for $sf$ in *permitted* $sf$ *in link budget level : Index* do    ▷ according to the table in Figure 10
10:     if $P_{sf} > maxP$ then
11:        $maxP \leftarrow P_{sf}$
12:        *output* $SF \leftarrow sf$
13: Find output TP so that output TP and SF still result in same link budget level: Index    ▷ according to the table in Table 2

COLLISION AWARE RADIO RESOURCE ALLOCATION

TECHNICAL FIELD

The present disclosure relates to systems and methods for controlling transmission settings for one or more wireless nodes in a wireless network.

BACKGROUND

In recent years, there has been a rapid evolution in the development of Internet of Things (IoT) technologies. This allows many devices to be connected within a network to share information and is particularly applicable to the integration of wireless network connectivity into traditionally non-connected devices. Having said this, increased network connectivity puts additional strain on the wireless network infrastructure.

The Low Power Wide Area (LPWA) network technologies were born out of the need to connect many devices located in wide geographical areas at a relatively low cost and energy consumption. Long Range Wide Area Network (LoRaWAN) is one of the most promising LPWA technologies due to its simplicity compared to alternative methods such as multihop mesh networks. In order to allocate limited radio resources for reliable and efficient communication, LoRaWAN adapts dynamically the communication parameters of the network devices through an Adaptive Data Rate (ADR) mechanism.

Having said this, there are issues with the choice of the most appropriate transmission parameters for each device in the network. LoRaWAN can suffer from problems with adapting to link changes in real world environments, collisions between transmissions in larger networks and energy efficiency.

Arrangements of the present invention will be understood and appreciated more fully from the following detailed description, made by way of example only and taken in conjunction with drawings in which:

FIG. 4 shows a flow chart according to an embodiment; and

FIG. 5 shows pseudo code of a method according to an embodiment.

DETAILED DESCRIPTION

Figure 1:
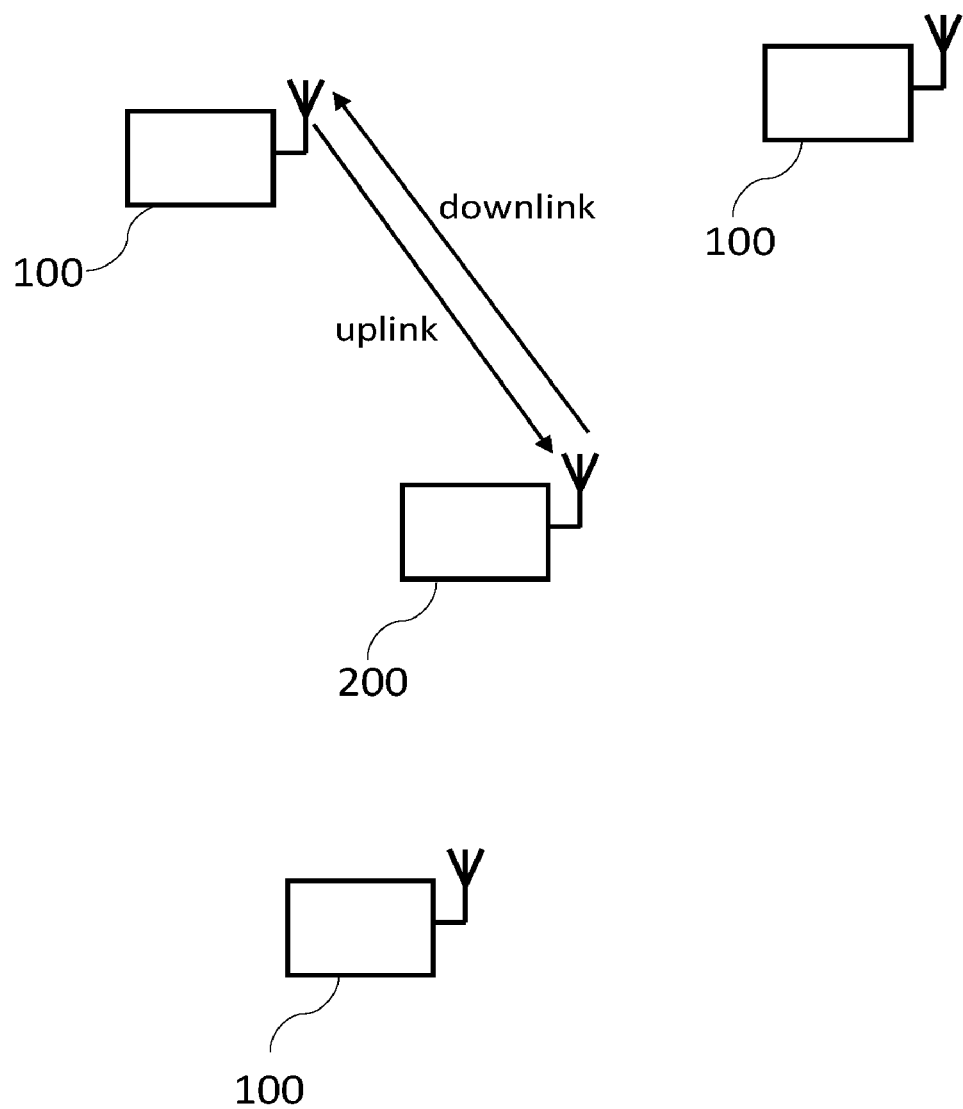
FIG. 1 shows a wireless network according to an embodiment.

According to an embodiment there is provided a method of radio resource allocation performed in a gateway or network server communicatively connected to a plurality of wireless nodes. The method comprises computing, for each spreading factor out of a number of spreading factors, a probability of successful receipt of an uplink communication from a wireless node from the plurality of wireless nodes based on spreading factor settings of the plurality of wireless nodes, determining, for a given link level budget, a spreading factor that provides a maximum likelihood of successfully completing uplink communications and determining, for the determined spreading factor, a transmission power that provides the given link level budget.

In an embodiment the gateway or network server has access to a predetermined table of transmit power and spreading factor pairs. Each pair is associated with a link level budget. The method further comprises determining said probability of success using at least one of a current number of wireless nodes that use each spreading factor, a current average packet interval time per wireless node or the current average Time-on-air of uplink packets using each spreading factor.

The probability of success, $P_{sf}$, may be determined by:

$$P_{sf} = e^{-2*G_{sf}}$$

wherein:

$$G_{sf} = \frac{N_{sf} * T_{sf}}{T_i}$$

$N_{sf}$ is a current numbers of wireless nodes using spreading factor sf, $T_{sf}$ is a current average Time-on-air of uplink packets using spreading factor sf and $T_i$ is a current average packet interval time per node.

The gateway or network server may have access to a predetermined table of transmit power and spreading factor pairs. Each pair is associated with a link level budget. The method further comprises determining the transmission power using the table.

The table may comprise a group of transmit power and spreading factor pairs for each link budget level.

The method may further comprise transmitting at least one of said determined spreading factor, said determined transmission power and said determined link level budget to a node of the plurality of nodes.

The method may further comprise receiving data from a node of the plurality of nodes at the determined spreading factor and transmission power.

According to an embodiment there is provided a non-volatile storage medium storing computer executable code for execution by a processor, the code configured to cause the processor, when executing the code, to perform a method described herein.

According to another embodiment there is provided a device communicatively connectable to a plurality of wireless nodes. The device is configured to compute, for each spreading factor out of a number of spreading factors, a probability of successful receipt of an uplink communication from a wireless node from the plurality of wireless nodes based on spreading factor settings of the plurality of wireless nodes, determine, for a given link level budget, a spreading factor that provides a maximum likelihood of successfully completing uplink communications and determine, for the determined spreading factor, a transmission power that provides the given link level budget. The device is a gateway or a network server.

As mentioned above, LoRaWAN provides an Adaptive Data Rate (ADR) mechanism that dynamically adapts the communication parameters of the devices within the network.

In order to provide reliable and efficient communications without sacrificing the property of being a Low Power Wide Area Network (LPWA), LoRaWAN provides the devices in the network with various adjustable transmission parameters, such as transmission power (TP) and spreading factor (SF).

Transmission power controls the power that is used for each transmission, for instance, by controlling the amplitude of the transmitted electromagnetic signals. A higher transmission power increases the probability of successful receipt of the transmission but also reduces the energy efficiency of the system and increases interference with neighboring transmissions.

Spreading factor represents the time over which a message is spread, with higher spreading factors representing longer transmission time, thereby increasing the time-on-air (increasing the likelihood of collision with other transmissions) but also increasing the probability of successful receipt of the transmission.

More specifically, the spreading factor is a measure of the number of chips used for the transmission of each symbol. SF relates to chip and symbol rates differently depending on the spreading scheme. The two equations below correspond to LoRa and direct-sequence spread spectrum techniques respectively.

$$2^{SF} = \frac{chip\ rate}{symbol\ rate}$$

$$SF = \frac{chip\ rate}{symbol\ rate}$$

In a spread spectrum communication scheme, such as LoRa, a chip is a bit that is transmitted over the channel. They are called chips to distinguish them from bits of the transmitted message, which are encoded before transmission. Different selections of transmission power and spreading factor can lead to different communication reliability and energy consumption. The link budget of a link accounts for losses and gains associated with wireless medium, communication system circuitry, antenna gains of transmitters and receivers etc. The link budget is affected by the transmission parameters for the communication link. For example, using higher TP or SF increases the link budget and achieves better communication reliability for the links; however, it also increases the overall energy consumption. Therefore, LoRaWAN introduces the Adaptive Data Rate (ADR) mechanism to decide these transmission parameter values dynamically.

Studies indicate that the ADR mechanism proposed by the LoRaWAN Alliance has several issues that limit the scalability, agility, and overall network throughput. In particular, as the network scales, the network throughput, reliability, and energy consumption degrade significantly. Moreover, the ADR mechanism is slow to adapt to inevitable changes in link conditions. This results in poor performance in terms of reliability.

There is a desire for a more effective and efficient method of coordinating transmissions in a low power wide area network that can be effectively scaled and adapted to real world conditions.

Disclosed herein is an improved ADR mechanism that includes novel radio resource mechanisms to overcome these challenges. The disclosed ADR mechanism, in comparison to the official ADR mechanism, doubles the data extraction rate for large network sizes with a similar level of energy consumption in simulations. Similarly, the wireless nodes using the advanced ADR converge to suitable communication settings in half of the time and energy consumption of the previous system.

There are a number of issues with the current ADR mechanism for LoRaWAN Networks.

Scalability

Previous studies have shown that the performance of LoRaWAN networks degrade significantly when the number of nodes within the network increases and the nodes start competing for limited radio resources. This is mainly due to the current ADR mechanism causing the transmission parameters for each node to be adapted greedily by only considering individual node link condition. Due to the nature of the LoRaWAN transmission technologies, this is usually not a good idea since the transmission resources are shared by all wireless nodes.

In order to achieve improved performance there is a need to determine the transmission parameters for all nodes cooperatively. This motivates a need for a network-aware configuration and optimisation for the selection of transmission parameters for the nodes in LoRaWAN networks.

Energy Efficiency

The failure caused by scalability of LoRaWAN leads to large numbers of collisions between uplink packets sent to the gateway/network server. The significant amount of collisions causes large energy consumption and poor performance. On the other hand, if the ADR lacks agility and takes time to settle on updated parameters, then a large number of packets sent by nodes will be wasted during the process of selecting suitable parameters, resulting in transmission and energy inefficiencies. Similarly, the inaccurate selection of parameters caused by incorrect link quality estimation causes collision and packet loss due to link changes and fading. Accordingly, the current ADR mechanism results in energy and transmission inefficiencies.

In light of the above, the embodiments described herein aim to improve transmission and energy efficiencies by providing a cooperative approach to the selection of transmission parameters.

The optimal link budget is maintained through the joint adaptation of values of transmission parameters. Increasing the SF by 1 gives a similar level of improvement in link budget as 3 dBm increase in TP. Furthermore, collision avoidance is improved by optimizing the utilization of multiple orthogonal radio resources, which can be used simultaneously without causing any collisions.

FIG. 1 shows a wireless network according to an embodiment. The network comprises a number of wireless nodes 100 and a gateway 200/network server 250. The wireless nodes 100 may be wireless nodes. Each wireless node 100 is configured to wirelessly communicate with the gateway 200/network server 250. The network may be a LoRaWAN network.

Figure 2:
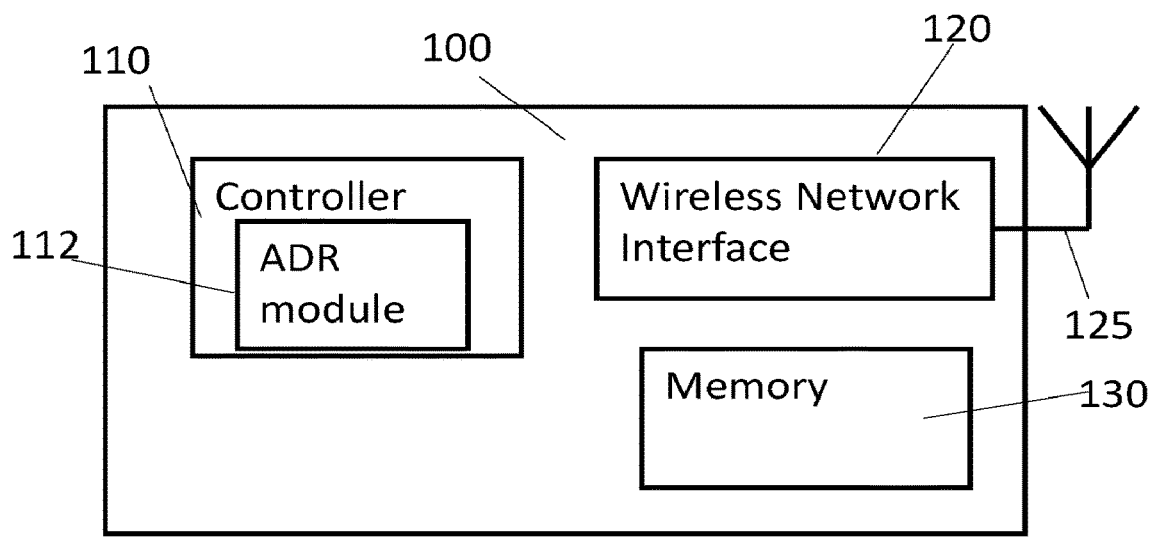
FIG. 2 shows a wireless node according to an embodiment.

FIG. 2 shows a wireless node 100 according to an embodiment. The wireless node 100 comprises a controller 110, a wireless network interface 120 connected to an antenna 125 and memory 130. The wireless network interface 120 is configured to transmit and receive wireless communications via the antenna 125. The controller 110 comprises an Adaptive Data Rate (ADR) module 112. The ADR module is software implemented within the controller 110 to control the controller 110 to monitor communications over the wireless interface 120 and to adjust the transmission parameters for the wireless node 100 according to the methods described herein. Memory 130 is configured to store computer executable code for instructing the controller 110 to perform the functions described herein. The wireless node 100 may be configured to store data from received communications in the memory 130.

Figure 3:
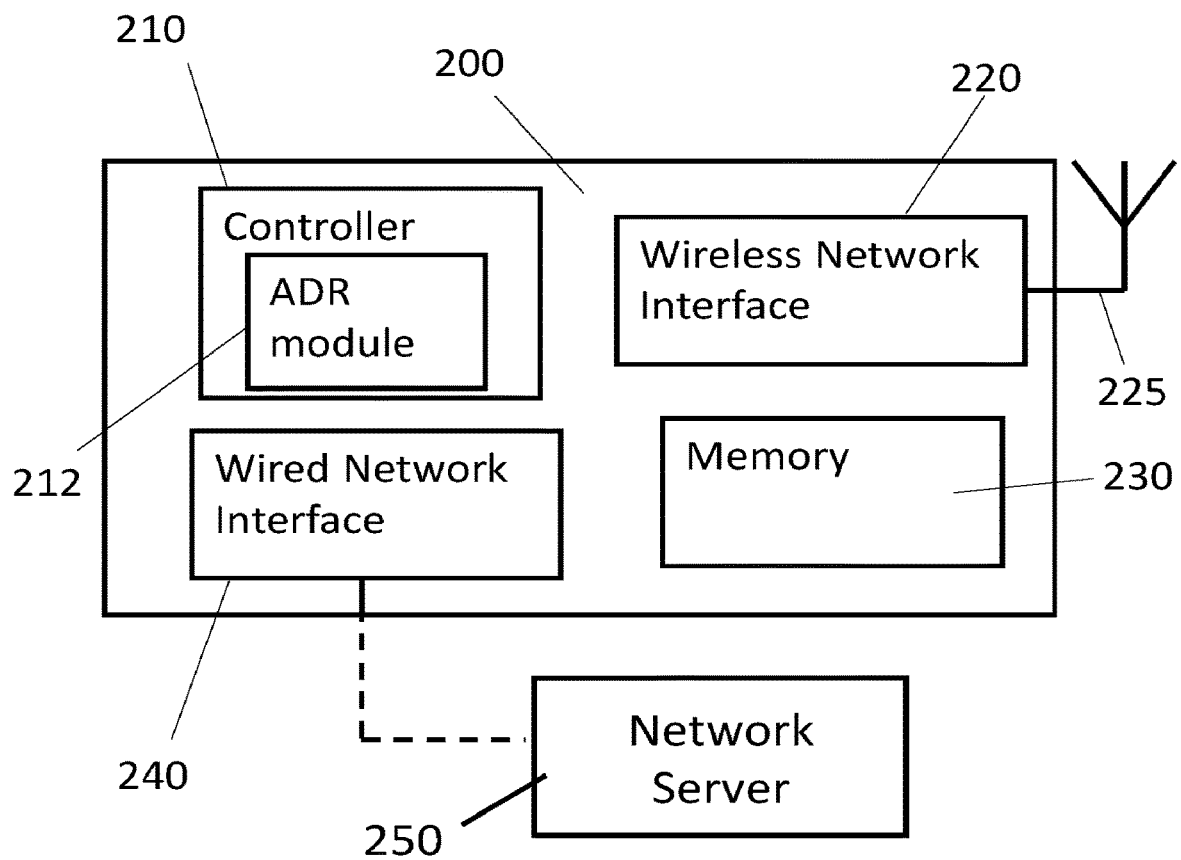
FIG. 3 shows a gateway and network server according to an embodiment.

FIG. 3 shows a gateway 200 according to an embodiment. The gateway 200 is configured similarly to the wireless node 100 in that it also comprises a controller 210 including an ADR module 212, a wireless network interface 220 connected to an antenna 225, and memory 230. The gateway 200 further includes a wired network interface 240. The ADR controller 210 and the ADR module 212 can also exclusively reside on an external device that is, in one embodiment, connected to the wired network interface 240. This external device can be referred to as a Network Server 250.

The wired network interface 240 is configured to communicate with external devices via a wired connection (shown as a dashed line in FIG. 3). Accordingly, the wireless nodes 100 may report to the gateway 200, which, in turn, can pass on information from the wireless nodes 100 to one or more external devices outside of the wireless network. Similarly, the gateway 200 can relay messages from the one or more external devices to the wireless nodes 100.

The ADR modules 212 and 112 of the gateway 200 and wireless nodes 100 manage the transmission parameters for their respective devices to avoid collisions within the network. Embodiments discussed herein relate to improvements to the functioning of the ADR modules 212/112 to improve power consumption and transmission efficiency. In the embodiment the ADR module 212 running at the gateway 200 or the network server 250 is configured to consider statistics based on receptions from more than one, preferably all, wireless nodes to decide the SF and TP value for individual wireless nodes 100 and minimise the likelihood of collision between them. For this purpose the gateway 200 and/or the network server 250 is configured to store information about current gateway utilisation in its memory to support performing collision aware radio resource allocation. In the embodiment the stored information is updated every time an uplink transmission is received.

Current ADR approaches select transmission parameters for end devices only based on individual link condition with the aim of minimising energy consumption and channel occupancy time. Higher SF leads to higher packet time-on-air, but TP will not affect the packet time-on-air. As a consequence high SF value is avoided as much as possible. Generally speaking, the permitted SF range for LoRaWAN is {7, 8, 9, 10, 11, 12}, while for permitted TP value is {2, 5, 8, 11, 14} dBm but these can be different for different hardware and other proprietary network configurations. The ADR mechanism increases the link budget by first attempting to increase the TP and then the SF value. Similarly, when the official ADR mechanism tries to decrease the link budget, it first seeks to reduce the SF value and then the TP value. The following table shows all possible combinations of SF and TP values (in dBm):

TABLE 1

Potential combinations of SF and TP.

| | {TP,SF} | | | | | |
|---|---|---|---|---|---|---|
| | SF = 7 | SF = 8 | SF = 9 | SF = 10 | SF = 11 | SF = 12 |
| TP = 2 | 2,7 | 2,8 | 2,9 | 2,10 | 2,11 | 2,12 |
| TP = 5 | 5,7 | 5,8 | 5,9 | 5,10 | 5,11 | 5,12 |
| TP = 8 | 8,7 | 8,8 | 8,9 | 8,10 | 8,11 | 8,12 |
| TP = 11 | 11,7 | 11,8 | 11,9 | 11,10 | 11,11 | 11,12 |
| TP = 14 | 14,7 | 14,8 | 14,9 | 14,10 | 14,11 | 14,12 |

As a result of the above discussed manner of increasing or decreasing the link budget the current official ADR mechanism will change TP and SF values along the left-hand column of Table 1 (i.e., Column 2) and along the bottom row of Table 1, so that the only TP/SF pairings considered are: {TP,SF}=2/7, 5/7, 8/7, 11/7, 14/7, 14/8, 14/9, 14/10, 14/11, 14/12.

Each of these setting can be considered as levels/classes of link budget. Higher link budget levels should provide the node with a higher chance to reach the gateway but at the cost of higher energy consumption. However, a high SF associated with high link budget level means high Time-on-air, increasing collision probability. Similarly, high TP associated with high link budget would also spend more energy. The current official ADR mechanism does not perform well, given that it only considers individual link quality regardless of SF allocations of the rest of the wireless nodes in the network.

In embodiments SF allocation is balanced based on the probability of success of uplink messages. In doing so, all available SF values are considered as candidates for use as future SF values.

The procedure can be summarised as follows and as shown in FIG. 4:
1. Compute the probabilities $P_{sf}$ that the gateway successfully receives uplink packets using each SF value (P7, P8, P9, P10, P11, P12) based on the gateway utilisation data.
2. On the premise of maintaining a current link budget level, find the permitted SF value with the maximum probability of success ($P_{sf}$).
3. Adjust/choose the corresponding TP value so that new setting SF' and TP' still results in the same link budget level.

In the first step, the gateway computes a table which contains estimations of probability of uplink transmission success using each spreading factor ($P_{sf}$=P7, P8, P9, P10, P11, P12) through following parameters stored as gateway utilisation data:
1. The current numbers of nodes using each spreading factor ($N_{sf}$=N7, N8, N9, N10, N11, N12). It will be appreciated that these spreading factors are just examples that find use in LoRaWAN. Different values can be used in other types of networks.
2. The current average packet interval time per node ($T_i$)
3. The current average Time-on-air of uplink packets using each spreading factor ($T_{sf}$=T7, T8, T9, T10, T11, T12)

These parameters can be easily accessed at the gateway or the network server since the gateway or the network server have access to past history of recently received packets. Since the LoRa uses an Aloha based protocol, the function for probability of transmission success known from aloha protocol can be used:

$$P_{sf} = e^{-2*G_{sf}} \quad (1)$$

where:

$$G_{sf} = \frac{N_{sf} * T_{sf}}{T_i}$$

Here $G_{sf}$ represents the number of packets attempted during the transmission of one packet with the same spreading factor sf. Therefore, for each spreading factor an individual probability of success can be determined.

In the second step in which the SF value with the maximum likelihood of success is determined the current link budget level may be considered. In another embodiment an alternative, for example higher, link budget level may be used to determine the SF value that is most likely to succeed. This higher link level budget may be determined in an iterative algorithm disclosed in co-pending patent applications with the titles "Link Quality Awareness for Uplink Transmissions from Nodes to Gateways" and "Transmission Parameter Probing and Searching for Agile Link Quality Adaptation", filed on the same date as the present application and both incorporated herein by reference in its entirety. This iterative algorithm can, in contrast to the current ADR mechanism, propose two link budget levels (lowerLBL and higherLBL). These are considered individually in determining a new TP/SF pairing for a wireless node.

Each row in the following table relates to a particular link budget level. The SF/TP pairings that fall under a particular link budget level are listed in the relevant row of this table:

TABLE 2

Potential combinations of SF and TP (in dBm) for various link budget levels

|  | {TP,SF} | {TP,SF} | {TP,SF} | {TP,SF} | {TP,SF} |
|---|---|---|---|---|---|
| Link Budget Level 1 | 2,7 | | | | |
| Link Budget Level 2 | 5,7 | 2,8 | | | |
| Link Budget Level 3 | 8,7 | 5,8 | 2,9 | | |
| Link Budget Level 4 | 11,7 | 8,8 | 5,9 | 2,10 | |
| Link Budget Level 5 | 14,7 | 11,8 | 8,9 | 5,10 | 2,11 |
| Link Budget Level 6 | 14,8 | 11,9 | 8,10 | 5,11 | 2,12 |
| Link Budget Level 7 | 14,9 | 11,10 | 8,11 | 5,12 | |
| Link Budget Level 8 | 14,10 | 11,11 | 8,12 | | |
| Link Budget Level 9 | 14,11 | 11,12 | | | |
| Link Budget Level 10 | 14,12 | | | | |

An increase in SF increases the time on air. The total energy invested in the transmission of a single symbol increases correspondingly. An increase of SF by one results in a single symbol being represented by twice the number of chips (see the formula of sf, chip rate and symbol rate for LoRa above), but also requires twice the radio on-time.

Similarly, if SF remains unaltered but TP is increased by 3 dBm, more energy is invested in the signal but without spreading it over time. Putting more energy in a single symbol increases the range because the signal remains detectable even if more energy is lost during transmission. LoRa's sensitivity improves by 3 dBm for each increment in SF. A 3 dBm increase of TP or an increment of SF changes the link budget in the same manner. The link budget can be calculated using:

$$\text{Link Level Budget Level} = (SF - SF_{min}) + \left(TP - \frac{TP_{min}}{3dBm}\right) + 1$$

where for LoRa $SF_{min}=7$, $TP_{min}=2$ dBm. The offset of one is added because the lowest link budget level is one.

In the second step, for the proposed link budget level, the combination of optimal SF and TP values that lead to the desired link budget level according to Table 2 are determined based on the already determined SF. In order to minimize the collision probability of uplink messages, the optimal SF value should be the one which results in least chance for uplink messages to collide with other uplink messages using same SF parameter. In other words, the SF value which has the highest probability of uplink transmission success (Psf) is chosen with the corresponding TP in the table. However, in Table 2, it is clear that for parameter combinations leading to the same link budget level, not all SF and TP values are available. As a result, within the same Link Budget Level, only the permitted SF values will be considered. Among these permitted SF values, the SF with the maximum probability of success (Psf) is chosen as the optimal parameter.

In the third step the TP value is adjusted according to the Table 2, so that same link budget level is maintained. For example, if the suggested link budget level as input to collision aware radio resource allocation mechanism is 'Link budget 6'. Assumed that at that moment, the SF=10 gives the maximum probability of success (P10=maximum) among the permitted SF values (8~12). Then the optimal SF value is 10. Afterwards, TP value is chosen as 8 according to the Table 2 so that link budget level is still at '6'.

FIG. 4 shows a pseudocode of the collision aware radio resource allocation.

Embodiments provide a balance between the utilisation of each spreading factors without the sacrifice of changing the probability to successfully reach the gateway (link budget). As a result, the congestion in the network will be minimised and meanwhile an appropriate link budget is maintained.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of radio resource allocation performed in a first communication apparatus communicatively connected to second communication apparatuses corresponding to wireless nodes, the method comprising:
   computing, for spreading factors, a probability of successful receipt of an uplink communication from a second communication apparatus from the second communication apparatuses based on a current number of second communication apparatuses that use a spreading factor, a current average packet interval time per second communication apparatus, and a current average Time-on-air of uplink packets using a spreading factor;
   determining, for a given link level budget, a spreading factor that provides a maximum likelihood of successfully completing uplink communications; and
   determining, for the determined spreading factor, a transmission power that provides the given link level budget,
   wherein said probability of successful receipt, $P_{sf}$, is determined based on:

$$P_{sf} = e^{-2*G_{sf}}$$

wherein:

$$G_{sf} = \frac{N_{sf} * T_{sf}}{T_i}$$

$N_{sf}$ is a current numbers of second communication apparatuses using spreading factor sf, $T_{sf}$ is a current average Time-on-air of uplink packets using spreading factor sf and $T_i$ is a current average packet interval time per second communication apparatus.

2. The method of claim 1, wherein the first communication apparatus has access to a predetermined table of transmit power and spreading factor pairs being associated with link level budgets.

3. The method of claim 1, wherein the first communication apparatus has access to a predetermined table of transmit power and spreading factor pairs being associated with link level budgets, the method further comprising:

determining said transmission power using said table.

4. The method of claim 3, wherein the table comprises a group of transmit power and spreading factor pairs for link budget levels.

5. The method of claim 1, further comprising transmitting at least one of said determined spreading factor, said determined transmission power and said given link level budget to a second communication apparatus of the second communication apparatuses.

6. The method of claim 1, further comprising receiving data from a second communication apparatus of the second communication apparatuses at the determined spreading factor and transmission power.

7. A non-volatile storage medium storing computer executable code for execution by a processor, the code configured to cause the processor, when executing the code, to perform the method of claim 1.

8. A device communicatively connectable to communication apparatuses corresponding to wireless nodes, the device configured to:

compute, for spreading factors, a probability of successful receipt of an uplink communication from a communication apparatus from the communication apparatuses based on a current number of communication apparatuses that use a spreading factor, a current average packet interval time per communication apparatus, and a current average Time-on-air of uplink packets using a spreading factor;

determine, for a given link level budget, a spreading factor that provides a maximum likelihood of successfully completing uplink communications; and determine, for the determined spreading factor, a transmission power that provides the given link level budget, wherein said probability of successful receipt, $P_{sf}$, is determined based on:

$$P_{sf} = e^{-2*G_{sf}}$$

wherein:

$$G_{sf} = \frac{N_{sf} * T_{sf}}{T_i}$$

$N_{sf}$ is a current numbers of second communication apparatuses using spreading factor sf, $T_{sf}$ is a current average Time-on-air of uplink packets using spreading factor sf and $T_i$ is a current average packet interval time per communication apparatus.

9. The device of claim 8, wherein the device has access to a predetermined table of transmit power and spreading factor pairs being associated with link level budgets.

10. The device of claim 8, wherein the device has access to a predetermined table of transmit power and spreading factor pairs being associated with link level budgets, the device further configured to:

determine said transmission power using said table.

11. The device of claim 10, wherein the table comprises a group of transmit power and spreading factor pairs for link budget levels.

12. The device of claim 8, further configured to transmit at least one of said determined spreading factor, said determined transmission power and said given link level budget to a communication apparatus of the communication apparatuses.

13. The device of claim 8, further configured to receive data from a communication apparatus of the communication apparatuses at the determined spreading factor and transmission power.

* * * * *